(12) United States Patent
Gifford et al.

(10) Patent No.: US 6,551,037 B2
(45) Date of Patent: Apr. 22, 2003

(54) REMOVABLE CHUCK

(75) Inventors: Robert H. Gifford, New Freedom, PA (US); Richard J. Heavel, Hanover, PA (US); Alfred H. Judge, Jarrettesville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/783,450

(22) Filed: Feb. 14, 2001

(65) Prior Publication Data

US 2001/0005068 A1 Jun. 28, 2001

Related U.S. Application Data

(63) Continuation-in-part of application No. 09/596,762, filed on Jun. 19, 2000, now Pat. No. 6,293,559, which is a continuation of application No. 09/167,305, filed on Oct. 6, 1998, now Pat. No. 6,079,716, which is a continuation-in-part of application No. 08/989,715, filed on Dec. 12, 1997, now Pat. No. 5,951,026.

(51) Int. Cl.[7] .............................................. B23B 31/10
(52) U.S. Cl. ........................ 408/239 R; 7/158; 7/165; 279/75; 279/145
(58) Field of Search ..................... 7/158, 165; 279/75, 279/143, 144, 145, 90, 91, 89, 78, 77, 101; 408/239 R, 239 A; 409/232, 234

(56) References Cited

U.S. PATENT DOCUMENTS

| | | | | |
|---|---|---|---|---|
| 3,743,307 A | * | 7/1973 | Benjamin et al. | 279/91 |
| 3,829,109 A | * | 8/1974 | Koch | 279/904 |
| 4,298,208 A | * | 11/1981 | Benjamin et al. | 279/155 |
| 4,328,975 A | * | 5/1982 | Heguy et al. | 279/155 |
| 4,456,271 A | * | 6/1984 | Kern et al. | 279/140 |
| 4,514,117 A | * | 4/1985 | Scott | 279/77 |
| 4,592,560 A | * | 6/1986 | Neumaier et al. | 279/81 |
| 4,784,543 A | * | 11/1988 | Mitchell et al. | 279/91 |
| 4,824,298 A | * | 4/1989 | Lippacher et al. | 173/48 |
| 4,834,596 A | * | 5/1989 | Hollifield et al. | 279/101 |
| 5,325,749 A | * | 7/1994 | Peris et al. | 279/143 |
| 5,342,154 A | * | 8/1994 | Holzer | 279/143 |
| 5,372,465 A | * | 12/1994 | Smith | 279/101 |
| 5,398,946 A | * | 3/1995 | Quiring | 279/30 |
| 5,437,465 A | * | 8/1995 | Vogele et al. | 279/22 |
| 5,481,949 A | | 1/1996 | Yen | 81/438 |
| 5,603,516 A | | 2/1997 | Neumaier | 279/19.5 |
| 5,651,647 A | * | 7/1997 | Ray | 408/239 R |
| 5,951,026 A | * | 9/1999 | Harman, Jr. et al. | 279/143 |
| 6,000,888 A | * | 12/1999 | Hartman | 173/59 |
| 6,047,971 A | * | 4/2000 | Harman, Jr. et al. | 279/143 |
| 6,079,716 A | * | 6/2000 | Harman, Jr. et al. | 279/75 |
| 6,176,655 B1 | * | 1/2001 | Ostermeier et al. | 279/91 |
| 6,293,559 B1 | * | 9/2001 | Harman, Jr. et al. | 279/75 |

FOREIGN PATENT DOCUMENTS

WO    WO 92/21469    * 12/1992

* cited by examiner

Primary Examiner—A. L. Wellington
Assistant Examiner—Monica Carter
(74) Attorney, Agent, or Firm—Harness, Dickey & Pierce, P.L.C.

(57) ABSTRACT

A removable chuck has a chuck member for holding a drill bit. Also, a mechanism is coupled with the chuck body to retain the chuck body to a drill spindle. The retention mechanism, in a first position, retains the chuck on the drill spindle and in a second position the chuck is enabled to be removed from the spindle.

12 Claims, 4 Drawing Sheets

REMOVABLE CHUCK

CROSS-REFERENCE TO RELATED APPLICATION

This application is a continuation-in-part of application Ser. No. 09/596,762 filed Jun. 19, 2000; now U.S. Pat. No. 6,293,559 which is a continuation of application Ser. No. 09/167,305 filed on Oct. 6, 1998, now U.S. Patent No. 6,079,716 issued Jun. 27, 2000; which is a continuation-in-part of application Ser. No. 08/989,715 filed on Dec. 12, 1997, now U.S. Pat. No. 5,951,026 issued Sep. 14, 1999, the specifications and drawings are herein expressly incorporated by reference.

FIELD OF THE INVENTION

The invention relates to rotatable tools such as drills, hammer drill, screwdrivers, and other power tools. More particularly, the present invention relates to a removable chuck for a hand-held tool.

BACKGROUND OF THE INVENTION

In the consumer market, it is desirable to use rotatable tools with a drill bit to form holes in a workpiece. Also, it is desirous to insert fasteners, such as screws with a regular or Phillips head into these holes to retain multiple workpieces together. Ordinarily, one uses the tool to drill the holes in the workpiece. After drilling the holes in the workpiece, the drill bit is removed from the chuck and a tool bit is inserted into the chuck to drive the fastener. While this has been an effective method for driving fasteners into the workpiece, it is burdensome and time consuming to continually drill holes remove the drill bit from the chuck and insert a tool bit to drive the fastener. Generally, this process is continued while connecting several workpieces together. Further, this process has been carried out in the professional power tool devices. Thus, it would be desirable to provide a chuck with the drill bit, which is removable from the tool to expose a spindle, with a tool bit, on the tool to drive the fasteners.

SUMMARY OF THE INVENTION

Accordingly, it is an object of the present invention to provide a removable chuck assembly embodying the foregoing design objectives.

In accordance with a first aspect of the invention, a removable chuck comprises a collar to connect with a rotatable spindle. The collar includes a retention member extending from the collar. A chuck is coupled with the collar. A locking member is adapted to couple with a spindle. The locking member includes a receiving member to couple with the collar extending retention member. A rotatable member couples with the locking member. The rotatable member is movable between two positions. In a first position, the rotatable member enables coupling of the extending member and the receiving member. In a second position, the rotatable member locks the extending member in the receiving member. The collar preferably includes three extending members and the locking member includes three receiving members. Each extending member includes a first portion axially extending from the chuck and a second portion transverse to the first portion. Each receiving member is a cut-out in a circular locking member. The rotatable member has an annular body and an extending skirt. The skirt includes three recesses to receive the second portion of the extending members. The recess has an open portion which enables receiving of the second portion in the first position of the rotatable member. The recess has a closed or slot portion to lock the second portion when the rotatable member is in the second position.

In accordance with a second aspect of the invention, a hand tool comprises a hand tool with a rotatable spindle. A removable chuck comprises a collar to connect with a rotatable spindle. The collar includes a retention member extending from the collar. A chuck is coupled with the collar. A locking member is adapted to couple with a spindle. The locking member includes a receiving member to couple with the collar extending member. A rotatable member couples with the locking member. The rotatable member is movable between two positions. In a first position, the rotatable member enables coupling of the extending member and the receiving member. In a second position, the rotatable member locks the extending member in the receiving member. The collar preferably includes three extending members and the locking member includes three receiving members. Each extending member includes a first portion axially extending from the chuck and a second portion transverse to the first portion. Each receiving member is a cut-out in a circular locking member. The rotatable member has an annular body and an extending skirt. The skirt includes three recesses to receive the second portion of the extending members. The recess has an open portion which enables receiving of the second portion in the first position of the rotatable member. The recess has a closed or slot portion to lock the second portion when the rotatable member is in the second position.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate the present invention and together with the description serve to explain the principles of the invention. In the drawings, the same reference numerals indicate the same parts.

DETAILED DESCRIPTION OF THE PREFERRED EMBODIMENT

Figure 1:
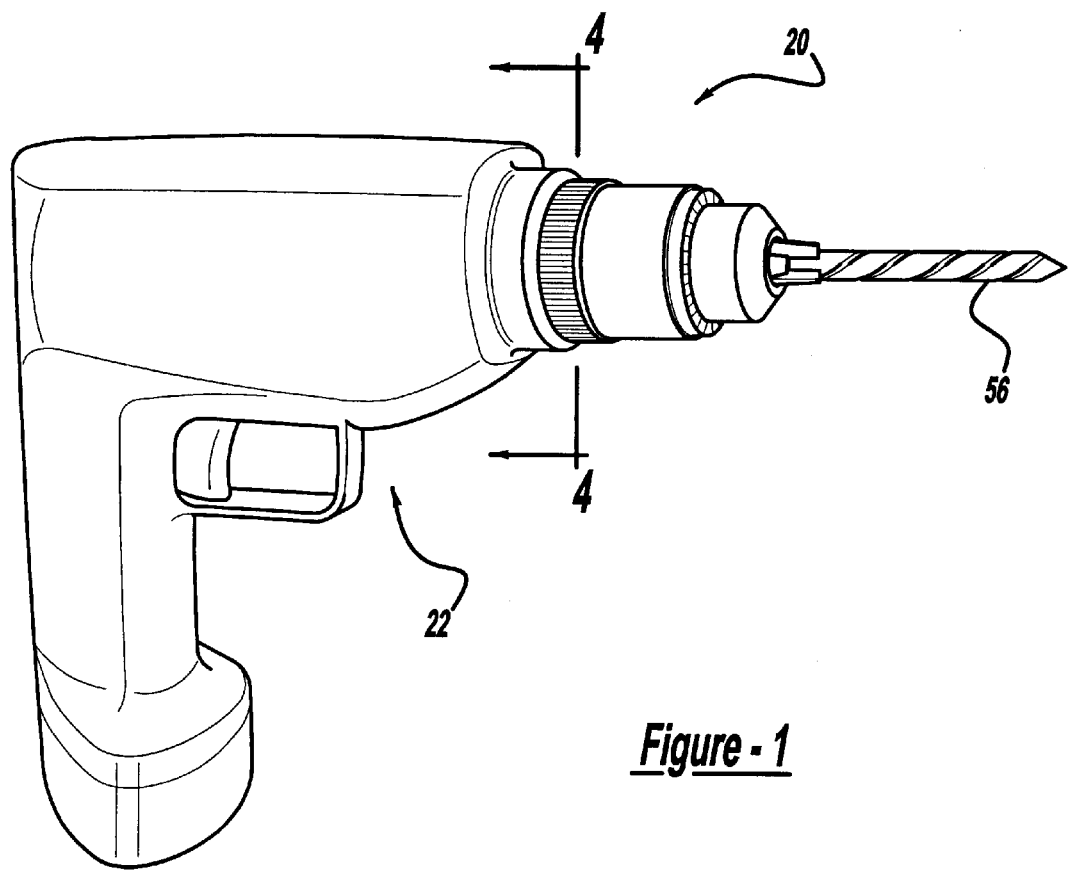
FIG. 1 is a perspective view of a tool with the removable chuck of the present invention.

Turning to the figures, particularly FIGS. 1–6, a removable chuck 20 is illustrated on a tool 22. In this particular embodiment, the tool 22 is a rotary drill, however a hammer drill or power screwdriver would work equally well. The drill 22 includes a spindle 24 which, in turn, includes an aperture 28 to receive a tool bit 30. A magnet 38 is positioned in the spindle 24 to magnetize the tool bit 30 as well as to retain the tool bit in the bore.

The chuck 20 includes a body 50, jaw members 52 with a locking sleeve 54, which are conventional, to retain a drill bit 56 within the chuck 20. A retaining mechanism 60 is at the rear of the chuck body 50 to enable the chuck 20 to be secured with and removed from the spindle 24.

Figure 6:
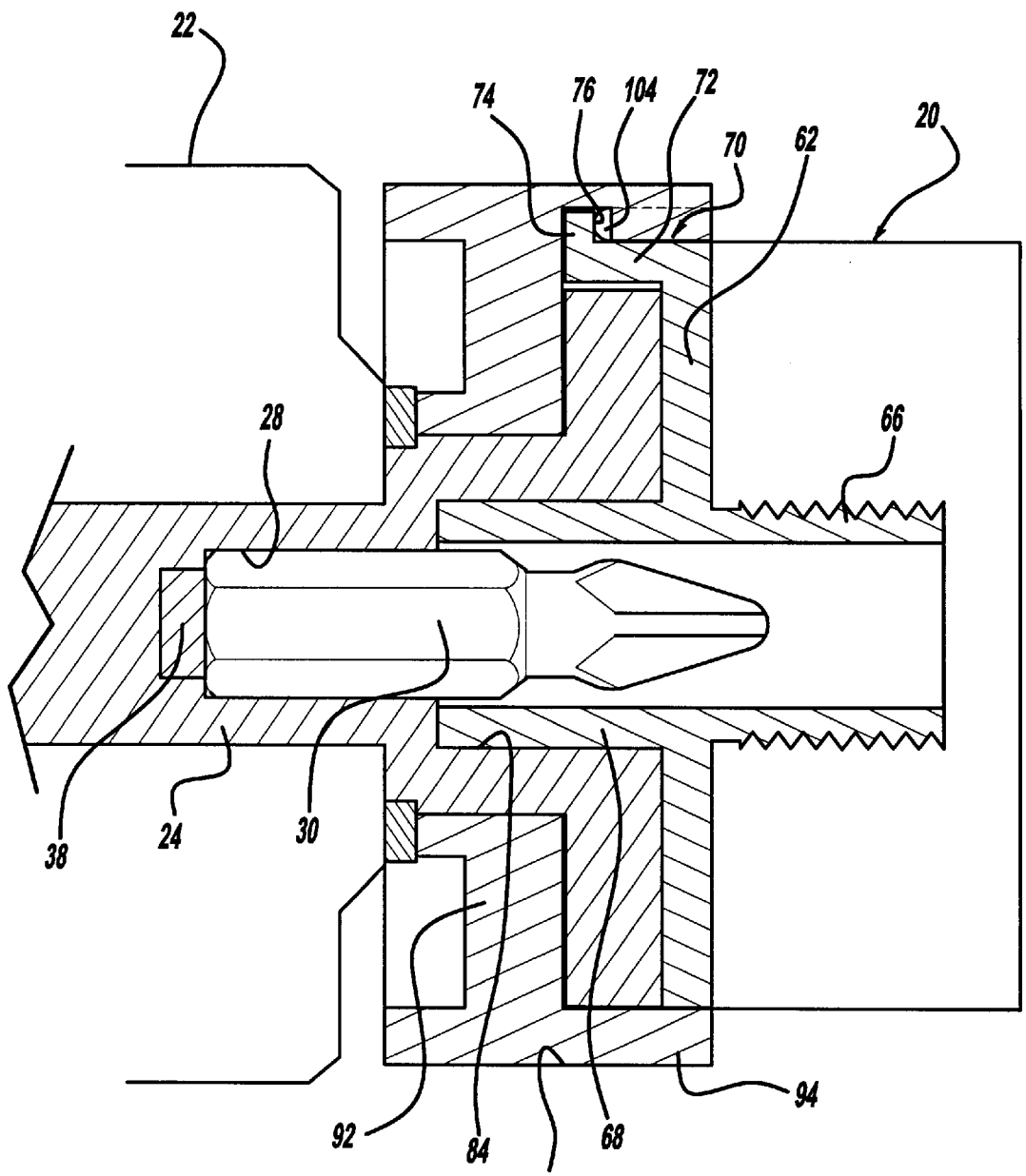
FIG. 6 is a cross-section view of FIG. 4 along line 6—6 thereof.

The retention mechanism 60 includes a collar attached to the chuck. The collar 61 has a disc-shaped body 62 with a tube 64 passing through the center of the body. The tube 64 has a first portion 66 which may include threads or the like to secure with the chuck 20. The tube has a second portion 68 projecting from the other side of the disc body 62 which enables alignment in the spindle bore 84. Also, the tube is hollow to enable passage of the tool bit 30 as seen in FIG. 6.

The body 62 includes at least one extending member 70. Preferably, there are three extending members 70 which are spaced 120° apart from one another around a circle. The extending members extend axially with respect to the chuck. The extending members 70 include a first leg portion 72 which is axially positioned along the chuck and a second foot portion 74 which extends transverse to the first leg portion 72. The foot portion 74 may include a cam surface 76.

A locking member 80 is retained on the spindle 24. The locking member 80 has an overall circular shape with at least one cut-out 82. Preferably, there are three cut-outs 82 to receive the extending members 70 of the collar 61. The cut-out portions 82 are spaced at 120° apart along the circumference of the locking member 80. The locking member has a bore 84 to receive the tubular portion 68 of the collar 61 for alignment purposes.

A rotatable locking ring 90 is positioned adjacent the locking member 80. The rotatable locking ring 90 includes a body 92 and an extending skirt 94. The body 92 includes a central aperture 96 which enables the body 92 to fit around the spindle 24. The skirt 94 includes at least one, and preferably three, recesses 98.

Each recess has an open portion 100 and a closed circumferential portion 102 providing an L-shape opening on the skirt. The open portion 100 enables the second portion 74 of the extending members 70 to be inserted into the skirt 94. Upon rotation of the ring 90, a skirt finger 104, which projects into the closed slot 102, moves along cam surface 76 of the second portion 74 of the extending member 70. As this occurs, the second portion 74 is moved into the closed slot portion of the recess 102. As the closed recess portion 102 surrounds the second portion 74, the collar 61 is locked onto the spindle 24 by the ring 90. A cover 106 may surround the skirt. The cover 106 may have a textured surface to provide a better grasping surface to enhance rotation of the rotating member 90 by the user.

Figure 2:
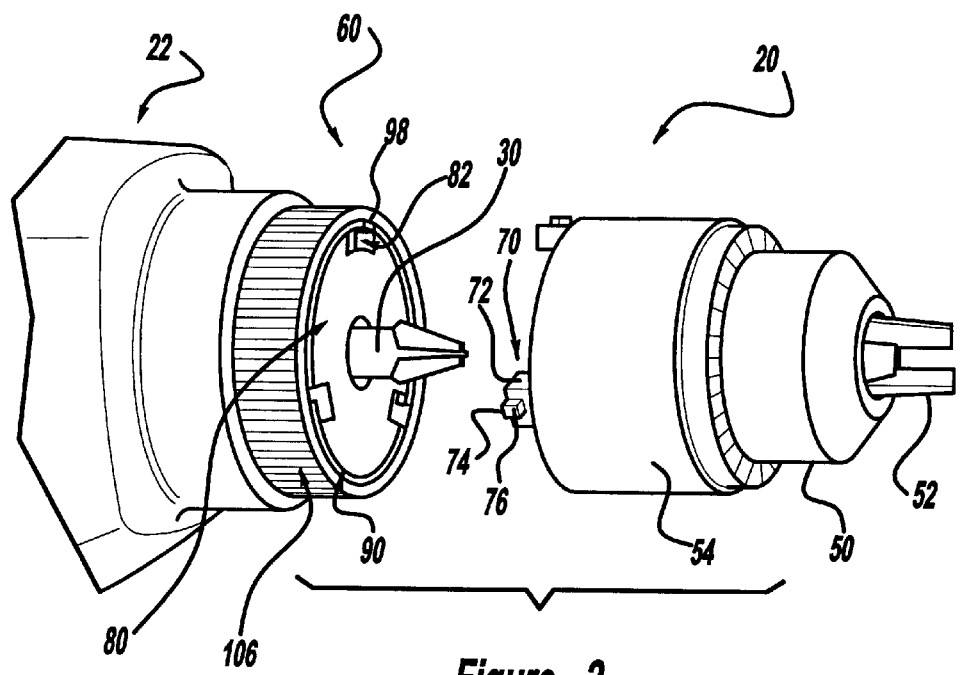
FIG. 2 is a perspective view of FIG. 1 with the chuck removed from the spindle.
Figures 3, 4:
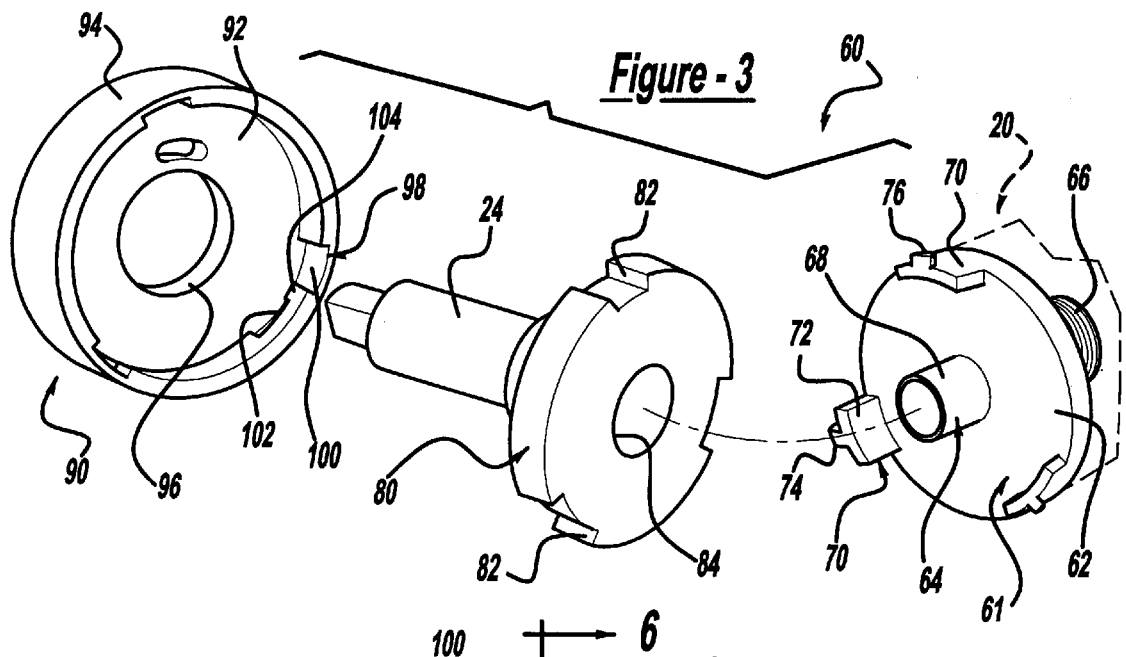
FIG. 3 is an exploded perspective view of the chuck retention member.
FIG. 4 is a cross-section view of FIG. 1 along line 4—4 thereof in an unlocked position.
Figure 5:
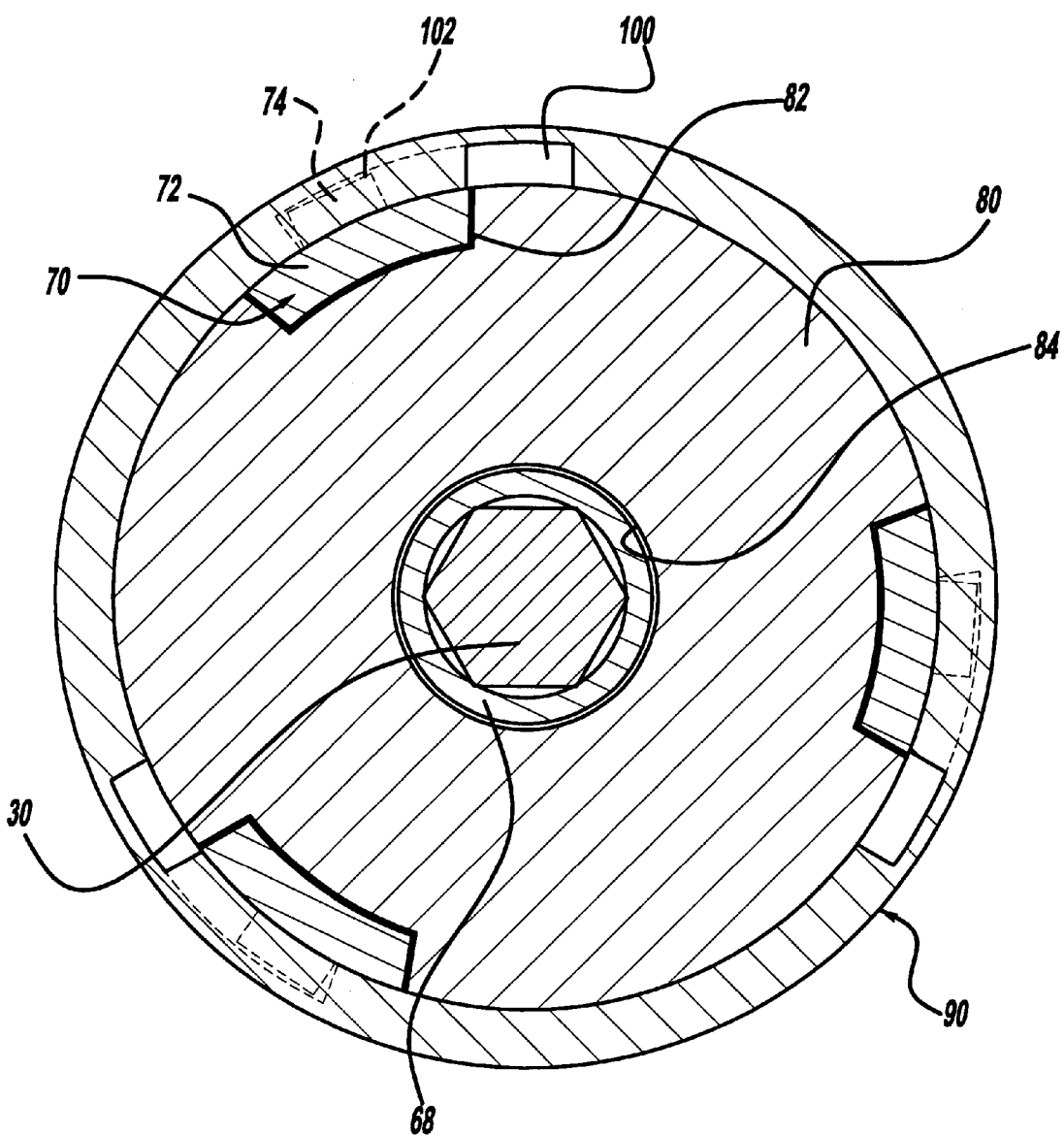
FIG. 5 is a cross-section view like that of FIG. 4 in a locked position.

Once the collar 61 is secured on the chuck 20, the extending members 70 are inserted into the receiving cut-outs 82 of the locking member 80. The extending members 70 positioned in the cut-outs 82 provide drive to the chuck 20. Once the second portion 74 has passed into the open portion of the recess 100, the ring 90 is rotated to capture the second portion 74 in the closed portion 102 of the recess 98. After this has occurred, the collar 61 is locked onto the locking portion and the spindle is able to rotate the chuck. To remove the chuck, the ring 90 is rotated in the opposite direction until the open portion 100 of the recess 98 is aligned with the second portion 74 of the extending member 70. Then, the chuck may be pulled axially away from the spindle. This enables removal of the chuck. As this occurs, the tool bit 30 would be visible and would be open for use by the user as seen in FIG. 2.

While the above detailed description describes the preferred embodiment of the present invention, the invention is susceptible to modification, variation, and alteration without deviating from the scope and fair meaning of the subjoined claims.

What is claimed is:

1. A removable drill chuck for a hand drill comprising:
   a collar for connecting with a rotatable spindle of the hand drill, said collar including a retention member extending from said collar;
   a chuck adapted to receive a plurality of different tool bits coupled with said collar;
   a locking member adapted for coupling with a spindle, said locking member including a receiving member for coupling with said collar extending member, and a separate rotatable member coupled with said receiving member, said rotatable member movable between two positions, wherein in a first position said rotatable member enables coupling of said extending member and said receiving member and in a second position said rotatable member locks said extending member in said receiving member.

2. The removable chuck according to claim 1, wherein said collar includes three extending members and said locking member includes three receiving members.

3. The removable chuck according to claim 2, wherein each extending member includes a first portion axially extending from said collar and a second portion transverse to said first portion.

4. The removable chuck according to claim 3, wherein each said receiving member being a cut-out portion in a circular locking member.

5. The removable chuck according to claim 4, wherein said rotatable member having an annular body and an extending skirt, said skirt including three recesses for receiving said second portions of said extending members.

6. The removable chuck according to claim 5, wherein each said recess having an open portion enabling receipt of said second portions in said first position of said rotatable member and a closed portion for locking said second portion when said rotatable member is in said position.

7. A hand tool comprising:
   a hand tool having a rotatable spindle;
   a removable chuck having a collar for connecting with said rotatable spindle, said collar including a retention member extending from said collar and a cutout on said collar enabling passage of a tool bit;
   a chuck coupled with said collar;
   a locking member coupled with said spindle, said locking member including a receiving member for coupling with said collar extending member, and a separate rotatable member coupled with said receiving member, said rotatable member movable between two positions, wherein in a first position said rotatable member enables coupling of said extending member and said receiving member and in a second position said rotatable member locks said extending member in said receiving member.

8. The hand tool according to claim 7, wherein said collar includes three extending members and said locking member includes three receiving members.

9. The hand tool according to claim 8, wherein each extending member includes a first portion axially extending from said chuck and a second portion transverse to said first portion.

10. The hand tool according to claim 9, wherein each said receiving member being a cut-out portion in a circular locking member.

11. The hand tool according to claim 10, wherein said rotatable member having an annular body and an extending skirt, said skirt including three recesses for receiving said second portions of said extending members.

12. The hand tool according to claim 11, wherein said recess having an open portion enabling receiving of said second portions in said first position of said rotatable member and a closed portion for locking said second portion when said rotatable member is in said second position.

* * * * *